(12) United States Patent
Wood et al.

(10) Patent No.: US 7,865,741 B1
(45) Date of Patent: Jan. 4, 2011

(54) SYSTEM AND METHOD FOR SECURELY REPLICATING A CONFIGURATION DATABASE OF A SECURITY APPLIANCE

(75) Inventors: Robert Paul Wood, San Mateo, CA (US); Robert Jan Sussland, San Francisco, CA (US)

(73) Assignee: NetApp, Inc., Sunnyvale, CA (US)

( * ) Notice: Subject to any disclaimer, the term of this patent is extended or adjusted under 35 U.S.C. 154(b) by 1169 days.

(21) Appl. No.: 11/508,431

(22) Filed: Aug. 23, 2006

(51) Int. Cl.
*G06F 11/30* (2006.01)
(52) U.S. Cl. .................. 713/193; 380/277; 380/278; 380/279; 380/280; 380/281; 380/282; 380/283; 380/284; 380/285; 380/286; 380/44; 380/45; 380/46; 380/47; 713/153; 713/154; 726/2; 726/11; 726/12; 726/13; 726/14; 726/15; 709/246; 709/247; 709/249
(58) Field of Classification Search ............. 726/26–30; 380/44–47, 277–286; 713/164–167, 153–154
See application file for complete search history.

(56) References Cited

U.S. PATENT DOCUMENTS

| | | | |
|---|---|---|---|
| 4,570,217 A | 2/1986 | Allen et al. | |
| 5,124,987 A | 6/1992 | Milligan et al. | |
| 5,163,131 A | 11/1992 | Row et al. | |
| 5,202,979 A | 4/1993 | Hillis et al. | |
| 5,278,979 A | 1/1994 | Foster et al. | |
| 5,403,667 A | 4/1995 | Simoens | |
| 5,581,724 A | 12/1996 | Belsan et al. | |
| 5,937,066 A * | 8/1999 | Gennaro et al. | 380/286 |
| 6,061,770 A | 5/2000 | Franklin | |
| 6,081,875 A | 6/2000 | Clifton et al. | |
| 6,341,341 B1 | 1/2002 | Grummon et al. | |
| 7,127,577 B2 | 10/2006 | Koning et al. | |
| 2005/0154907 A1* | 7/2005 | Han et al. | 713/193 |
| 2007/0055894 A1* | 3/2007 | Osaki | 713/193 |

OTHER PUBLICATIONS

Akyurek, Sedat, *Placing Replicated Data to Reduce Seek Delays*, Department of Computer Science, University of Maryland, UMIACS-TR-91-121, CS-TR-2746, Aug. 1991.
Bitton, Dina, *Disk Shadowing*, Proceedings of the 14th VLDB Conference, LA, CA 1988.
Chaudhuri, Surajit, et al., *Self-Tuning Technology in Microsoft SQL Server*, Data Engineering Journal 22, 2 1999 pp. 20-27.
Chutani, Sailesh, et al., *The Episode File System*, In Proceedings of the USENIX Winter 1992.

(Continued)

*Primary Examiner*—Taghi T Arani
*Assistant Examiner*—Josnel Jeudy
(74) *Attorney, Agent, or Firm*—Cesari and McKenna, LLP

(57) ABSTRACT

A system and method securely replicates a configuration database of a security appliance. Keys stored on an original configuration database of an original security appliance are organized as a novel key hierarchy. A replica or clone of the original security appliance may be constructed in accordance with a cloning technique of the invention. Construction of the cloned security appliance illustratively involves sharing of data between the appliances, as well as substantially replicating the key hierarchy on a cloned configuration database of the cloned appliance.

17 Claims, 6 Drawing Sheets

OTHER PUBLICATIONS

Coyne, Robert A., et al., *Storage Systems for National Information Assets*, Proc. Supercomputing 92, Minneapolis, Nov. 1992, pp. 626-633.

Finlayson, Ross S., et al., *Log Files: An Extended File Service Exploiting Write-Once Storage* Department of Computer Science, Stanford University, Report No. STAN-CS-87-1177, Sep. 1987.

Gray, Jim, et al., *The Recovery Manager of the System R Database Manager*, ACM Computing Surveys, (13)2:223-242 1981.

Hecht, Matthew S., et al. *Shadowed Management of Free Disk Pages with a Linked List*, ACM Transactions on Database Systems, 8/4, Dec. 1983, pp. 503-514.

Howard, John, H. et al., *Scale and Performance in a Distributed File System*, Carnegie Mellon University, CMU-ITC-87-068, Aug. 1987.

Howard, John H. *An Overview of the Andrew File System*, Carnegie Mellon University, CMU-ITC-88-062 1988.

Howard, John, H. et al., *Scale and Performance in a Distributed File System*, ACM Trans. Computer System, 6(1), Feb. 1988 pp. 51-81.

Kazar, Michael Leon, *Synchronization and Caching Issues in the Andrew File System*, Carnegie Mellon University, CMU-ITC-88-063.

Kazar, Michael L. et al., *DEcorum File System Architectural Overview*, USENIX Summer Conference, Anaheim, California, 1990.

Kemper, Alfons, et al., *Performance Tuning for SAP R/3*, Data Engineering Journal 22, 2 1999 pp. 33-40.

Kent, Jack et al., *Optimizing Shadow Recovery Algorithms*, IEEE Transactions on Software Engineering, 14( 2): 155-168 , Feb. 1988.

Kistler, et al., *Disconnected Operation in the Coda File System, ACM Transactions on Computer Systems*, vol. 10, No. 1, Feb. 1992, pp. 3-25.

Lorie, Raymond, A. *Physical Integrity in a Large Segmented Database*, ACM Trans. Database Syst., vol. 2, Mar. 1977, pp. 91-104.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 Sep. 1988.

Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.

Quinlan, Sean, *A Cached WORM File System*, Software-Practice and Experience, 21(12):1289-1299 1991.

Rosenblum, Mendel, et al., *The LFS Storage Manager*, Computer Science Division, Electrical Engineering and Computer Sciences, Univ. of CA, presented at Summer '90 USENIX Technical Conference, Anaheim, CA Jun. 1990.

Rosenblum, Mendel, et al. *The Design and Implementation of a Log-Structured File System* Jul. 24, 1991 pp. 1-15.

Rosenblum, Mendel, *The Design and Implementation of a Log-Structured File System*, 1992 pp. 1-93.

Rosenblum, Mendel, et al., *The Design and Implementation of a Log-Structured File System*, In Proceedings of ACM Transactions on Computer Systems, (10)1:26-52, Feb. 1992.

Schiefer, Berni, et al., *DB2 Universal Database Performance Tuning*, Data Engineering Journal 22, 2 1999 pp. 12-19.

Seltzer, Margo I., et al., *Journaling Versus Soft Updates: Asynchronous Meta-Data Protection in File Systems*, Proceedings of 200 UNSENIX Annual Technical Conference, Jun. 18-23, 2000.

Shasha, Dennis, *Tuning Time Series Queries in Finance: Case Studies and Recommendations*, Data Engineering Journal 22, 2 1999 pp. 41-47.

Sidebotham, Bob, *Volumes: The Andrew File System Data Structuring Primitive*, EEUG Conference Proceedings, Manchester, UK, Autumn 1986.

Subramanian, Muralidhar, et al, *Performance Challenges in Object-Relational DBMSs*, Data Engineering Journal 22, 2 1999 pp. 28-32.

Weikum, Gerhard, et al., *Towards Self-Tuning Memory Management for Data Servers*, Data Engineering Journal 22, 2 1999 pp. 3-11.

West, Michael, et al. *The ITC Distributed File System: Prototype and Experience*, Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.

\* cited by examiner

SYSTEM AND METHOD FOR SECURELY REPLICATING A CONFIGURATION DATABASE OF A SECURITY APPLIANCE

CROSS-REFERENCE TO RELATED APPLICATION

The present invention is related to the following commonly assigned U.S. patent application Ser. No. 10/478,386 titled, Encryption Based Security System for Network Storage, filed May 14, 2003, which application is hereby incorporated by reference.

FIELD OF THE INVENTION

The present invention relates to security appliances, and more specifically, to secure replication of a configuration database of a security appliance.

BACKGROUND OF THE INVENTION

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of data containers, such as files on, e.g., the disks. Each "on-disk" file may be implemented as a set of data structures, e.g., disk blocks, configured to store information, such as the actual data (i.e., file data) for the file.

The file server, or filer, may be further configured to operate according to a client/server model of information delivery to thereby allow many client systems (clients) to access shared resources, such as files, stored on the filer. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow clients to remotely access the information (files) on the filer. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS) and the Network File System (NFS) protocols, the utility of the filer may be enhanced for networking clients.

A SAN is a high-speed network that enables establishment of direct connections is between a storage system and its storage devices. The SAN may thus be viewed as an extension to a storage bus and, as such, an operating system of the storage system enables access to stored data using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC (e.g., FCP) or TCP (iSCSI).

SCSI is a peripheral input/output (I/O) interface with a standard, device independent protocol that allows different peripheral devices, such as disks, to attach to a storage system. In SCSI terminology, clients operating in a SAN environment are "initiators" that initiate commands and requests to access data. The storage system is thus a "target" configured to respond to the data access requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

A SAN arrangement or deployment allows decoupling of storage from the storage system, such as an application server, and some level of information storage sharing at the storage system level. There are, however, environments wherein a SAN is dedicated to a single storage system. In some SAN deployments, the information is organized in the form of databases, while in others a file-based organization is employed. Where the information is organized as files, the client requesting the information maintains file mappings and manages file semantics, while its requests (and storage system responses) address the information in terms of block addressing on disk using, e.g., a logical unit number (lun).

A network environment may be provided wherein information (data) is stored in secure storage served by one or more storage systems coupled to one or more security appliances. Each security appliance is configured to transform unencrypted data (cleartext) generated by clients (or initiators) into encrypted data (ciphertext) destined for secure storage or "cryptainers" on the storage system (or target). As used herein, a cryptainer is a piece of storage on a storage device, such as a disk, in which the encrypted data is stored. In the context of a SAN environment, a cryptainer can be, e.g., a disk, a region on the disk or several regions on one or more disks that, in the context of a SAN protocol, is accessible as a lun. In the context of a NAS environment, the cryptainer may be a collection of files on one or more disks. Specifically, in the context of the CIFS protocol, the cryptainer may be a share, while in the context of the NFS protocol, the cryptainer may be a mount point. In a tape environment, the cryptainer may be a tape containing a plurality of tape blocks.

Each cryptainer is associated with its own encryption key, e.g., a cryptainer key, which is used by the security appliance to encrypt and decrypt the data stored on the cryptainer. An encryption key is a code or number which, when taken together with an encryption algorithm, defines a unique transformation used to encrypt or decrypt data. Data remains encrypted while stored in a cryptainer until requested by an authorized client. At that time, the security appliance retrieves the encrypted data from the cryptainer, decrypts it and forwards the unencrypted data to the client.

A configuration database of the security appliance stores encryption keys used to encrypt/decrypt data stored on the cryptainers. In addition, the configuration database may store configuration settings, permissions and access control lists for various clients of the appliance/storage system. Accordingly, a key management problem involves making identical copies of, i.e., replicating, the configuration database, particularly to protect against possible failure to an original security appliance. Replication of the configuration database is also desirable when creating multiple security appliances, each having the same configuration settings, permissions, etc. The use of such database replicas may be advantageous in a large customer enterprise environment that requires substantial storage (secure) bandwidth.

A previous technique used to replicate a security appliance involves key translation, wherein recovery keys stored on recovery cards are decrypted to plaintext at a key management server and then re-keyed using an appropriate key of the target (replica) security appliance to form one or more cryptainer keys used at the replica. Typically, the recovery keys are RSA keys and an asymmetrical cryptographic process is employed that involves encryption of relatively large (e.g., 256-bit) cryptainer keys using a key with a relatively small (e.g., 80-bit) security level. Note that an RSA key would have to be over 15,000 bits long to achieve the security level of an Advanced Encryption Standard AES-256 key.

In addition, all recovery cards are needed to securely restore keys of the security appliance. As used herein, to "restore" a key means to unwrap the key from a copy of the wrapped key by means of additional key material, e.g., recovery keys. Wrapping, in this context, denotes encryption and signing; each key illustratively includes an encryption component, a signature component and various metadata of a package. Thus, to "wrap" a second key with a first key means that the encryption component of the first key is used to encrypt both encryption and signature components of the second key, and the signature component of the first key is used to sign the entire second key (encryption and signature components, as well as the metadata). To "unwrap" a key, a reverse of the above operation is followed. Moreover, the operations (e.g., decryption or signature verification) involving the recovery keys are performed in software on, e.g., a personal computer of the key management server, thereby rendering the replication technique insecure.

SUMMARY OF THE INVENTION

The disadvantages of the prior art are overcome by providing a system and method for securely replicating a configuration database of a security appliance. Keys stored on an original configuration database of an original security appliance are organized as a key hierarchy. A replica or clone of the original security appliance's key hierarchy may be constructed in accordance with a novel cloning technique of the invention. Construction of the cloned security appliance illustratively involves sharing of data between the appliances, as well as substantially replicating the key hierarchy on a cloned configuration database of the cloned appliance. The novel key hierarchy comprises one or more recovery policy keys. Additional keys of the key hierarchy that are wrapped by these recovery policy keys include domain keys and secure storage, i.e., cryptainer, keys.

According to the cloning technique, a copy of data on the original configuration is database is loaded onto the cloned configuration database of the cloned security appliance. The SEP of the cloned security appliance generates the master key and the first non-recoverable recovery policy key of the key hierarchy for storage on the cloned configuration database, as described herein. Recovery keys from a quorum of recovery cards are then applied to the cloned configuration database to restore the key hierarchy on the cloned security appliance. The quorum of recovery cards has the appropriate recovery policy keys needed to replicate all keys from a corresponding "recoverable" portion of the key hierarchy, e.g., the second and third recovery policy keys, as well as all domain keys and cryptainer keys "below" those recovery policy keys in the hierarchy. By applying recovery keys from the recovery cards to the cloned configuration database, substantially all of the key material of the original configuration database may be replicated on the cloned configuration database of the cloned security appliance.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
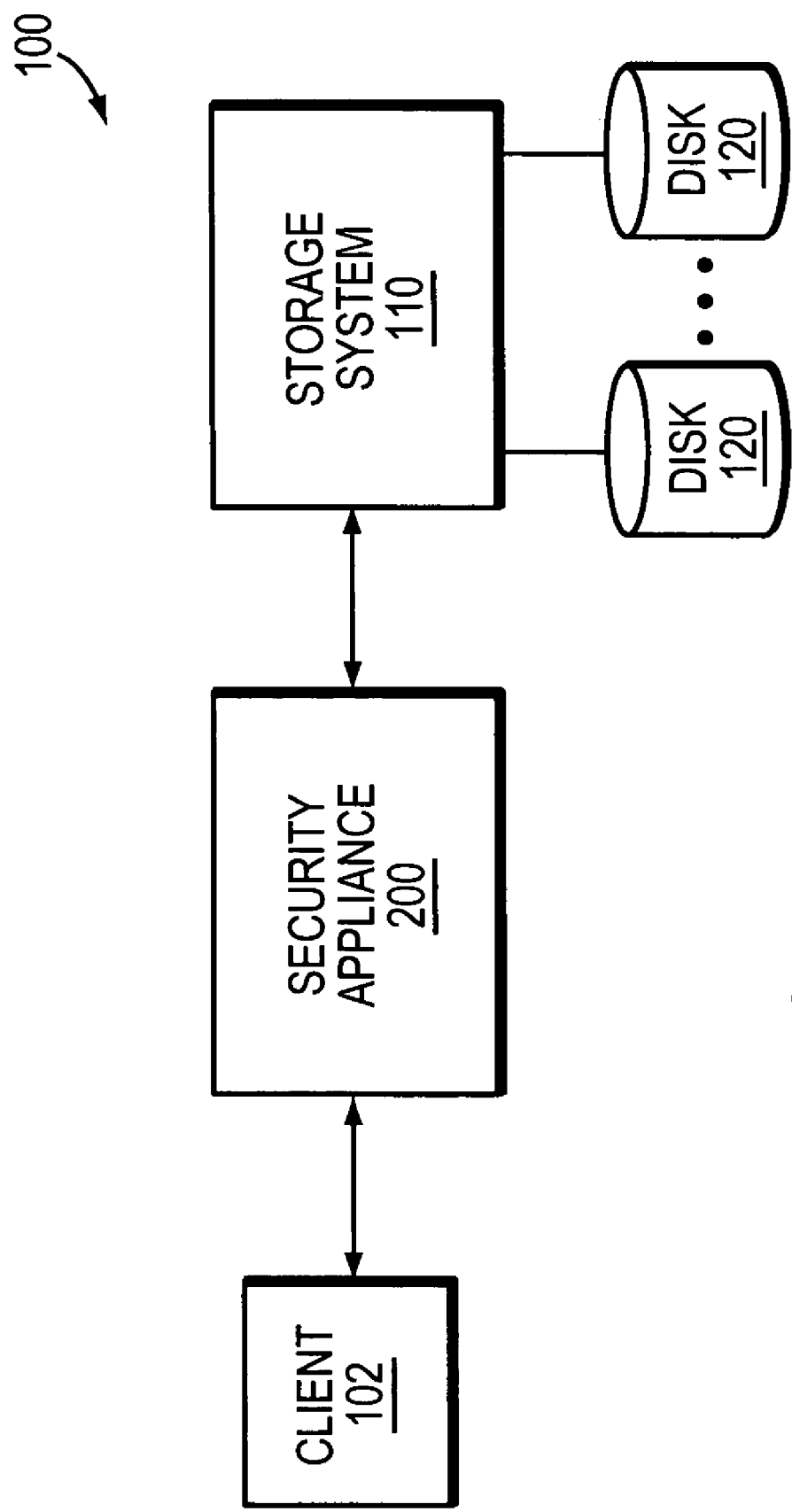
FIG. 1 is a schematic block diagram of an environment including a multi-protocol security appliance that may be advantageously used with the present invention.

FIG. 1 is a schematic block diagram of an environment 100 including a multi-protocol security appliance 200 that may be advantageously used with the present invention. The security appliance 200 is coupled between one or more clients 102 and one or more storage systems 110, such as an application server or filer. The security appliance 200, which is configured to act as an encryption proxy, intercepts a data access request issued by client 102 and destined for the storage system 110, wherein the data access request may be a read request to retrieve certain data stored on storage devices, such as disks 120, coupled to the storage system 110 or a write request to store data on the disks. In the case of a write request, the security appliance 200 intercepts the request, encrypts the data associated with the request and forwards the encrypted data to the storage system 110 for storage at a specified location (address) on disk 120. In the case of a read request, the security appliance intercepts the request and forwards it onto the storage system, which returns the requested data to the appliance in encrypted form. The security appliance 200 then decrypts the encrypted data and returns the decrypted data to the client 102.

In the illustrative embodiment, the security appliance employs a conventional encryption algorithm, e.g., the Advanced Encryption Standard (AES) or other appropriate algorithms, to transform unencrypted data (cleartext) generated by the clients 102 into encrypted data (ciphertext) intended for secure storage, i.e., one or more cryptainers, on the storage system 110. To that end, the security appliance illustratively uses a highquality, software or hardware-based pseudo random number generation technique to generate encryption keys. The encryption and decryption operations are performed using these encryptions keys, such as a cryptainer key associated with each cryptainer. As described herein, the security appliance 200 uses an appropriate cryptainer key to encrypt or decrypt portions of data stored in a particular cryptainer. In addition to performing encryption and decryption operations, the security appliance 200 also performs access control, authentication, virtualization, and secure-logging operations.

Figure 2:
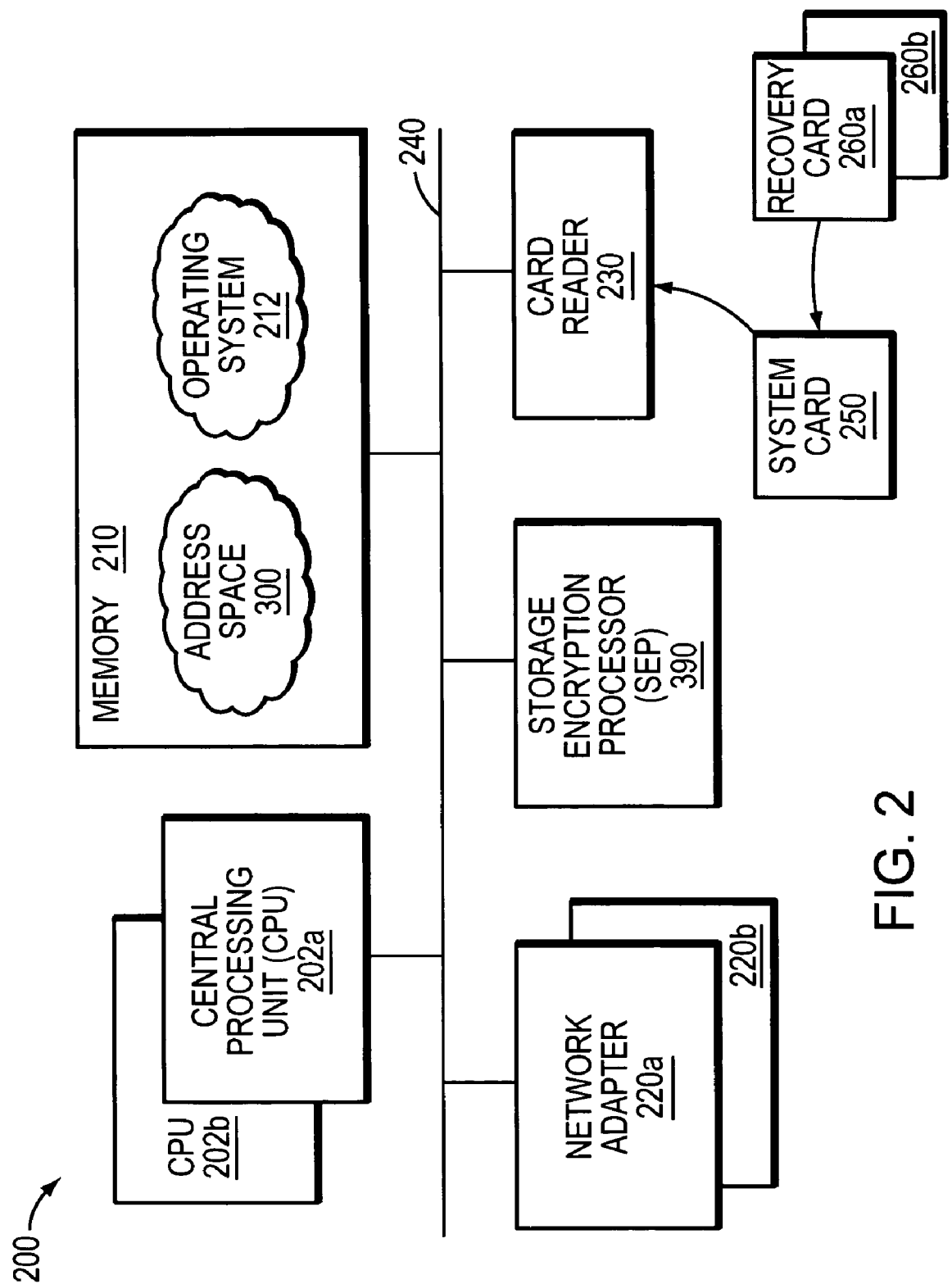
FIG. 2 is a schematic block diagram of the multi-protocol security appliance that may be advantageously used with the present invention.

FIG. 2 is a schematic block diagram of the multi-protocol security appliance 200 that may be advantageously used with the present invention. As used herein, a security appliance denotes a computer having features such as simplicity of security service management for users (system administrators) and clients of network attached storage (NAS) and storage area network (SAN) deployments. The security appliance comprises one or more processors, e.g., central processing units (CPU 220a,b), a memory 210, one or more network adapters 220a,b, a storage encryption processor (SEP 390) and a card reader 230 interconnected by a system bus 240, such as a conventional Peripheral Component Interconnect (PCI) bus. The SEP 390 is configured to perform all encryption and decryption operations for the security appliance in a secure manner; for example, the SEP is configured to protect plaintext encryption keys from system software executing on each CPU 202. Accordingly, the SEP is illustratively embodied as a FIPS 140-2 level-3 certified module that is epoxy-potted onto a dedicated interface card or other similar card.

The card reader 230 provides an interface for one or more "smart" recovery cards 260 a, b for use in cloning a configuration database in accordance with the present invention.

Operationally, encryption keys are exchanged between the SEP 390 and system card 250, where they are "secret shared" (cryptographically assigned) to the recovery cards 260 as recovery keys, as described herein. These recovery keys can thereafter be applied (via the recovery cards) to the security appliance 200 to enable restoration of other encryption keys (such as cryptainer keys). A quorum setting for the recovery cards 260 may be provided such that the recovery keys stored on the recovery cards are backed up in a threshold scheme whereby, e.g., any 2 of 5 cards can recover the keys.

In the illustrative embodiment, the threshold scheme of the recovery cards 260 is configured to split recovery policy keys that are based on various policies for recovery. For example, policy recovery keys may be split in a 2 out of 5 mechanism, whereby two policy keys are needed to encrypt domain keys which, in turn, encrypt the cryptainer is keys. Therefore, a hierarchy of encryption keys is provided that generates a plurality (e.g., thousands) of cryptainer keys without the need for as many recovery policy keys ("secret shares"). Note that the secret shares are not stored as such on the recovery cards, but rather are encrypted with a key that is assigned to each of the recovery cards. Therefore, the secret shares are "cryptographically assigned" to the recovery cards 260.

The network adapters 220 couple the security appliance 200 between one or more clients 102 and one or more storage systems 110 over point-to-point links, wide area networks, virtual private networks implemented over a public network (Internet) or shared local area networks. In a SAN environment configured to support various Small Computer Systems Interface (SCSI)-based data access protocols, including SCSI encapsulated over TCP (iSCSI) and SCSI encapsulated over FC (FCP), the network adapters 220 may comprise host bus adapters (HBAs) having the mechanical, electrical and signaling circuitry needed to connect the appliance 200 to, e.g., a FC network. In a NAS environment configured to support, e.g., the conventional Common Internet File System (CIFS) and the Network File System (NFS) data access protocols, the network adapters 220 may comprise network interface cards (NICs) having the mechanical, electrical and signaling circuitry needed to connect the appliance to, e.g., an Ethernet network.

The memory 210 illustratively comprises storage locations that are addressable by the processors and adapters for storing software programs and data structures associated with the present invention. The processor and adapters may, in turn, comprise processing elements and/or logic circuitry configured to execute the software programs and manipulate the data structures. An operating system 212, portions of which is typically resident in memory and executed by the processing elements, functionally organizes the appliance 200 by, inter alia, invoking security operations in support of software processes and/or modules implemented by the appliance. It will be apparent to those skilled in the art that other processing and memory means, including various computer readable media, may be used for storing and executing program instructions pertaining to the invention described herein.

Figure 3:
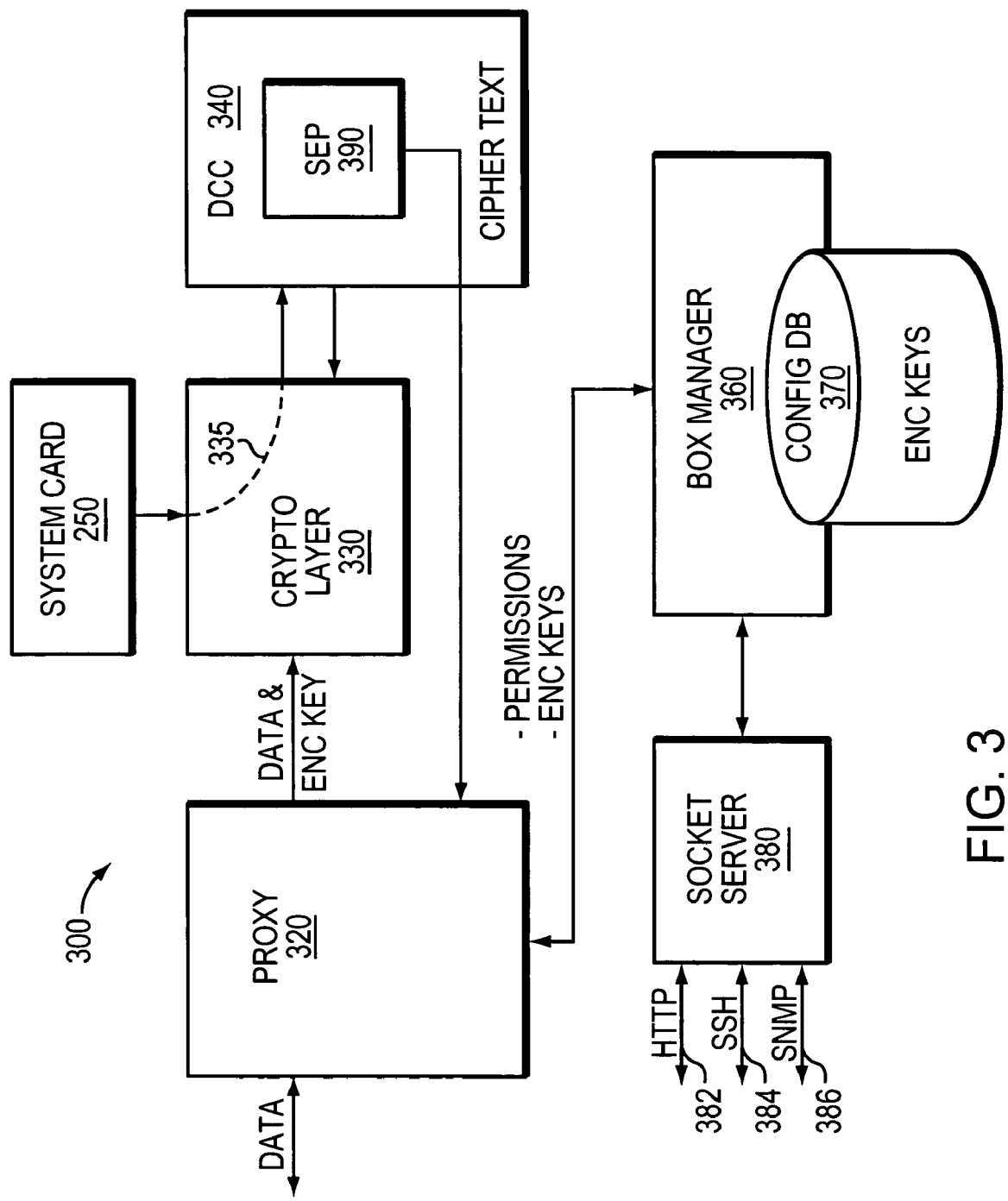
FIG. 3 is a schematic diagram illustrating an arrangement of software processes and modules executing on the security appliance in accordance with the present invention.

The operating system 212 illustratively organizes the memory 210 into an address is space arrangement available to the software processes and modules executing on the processors. FIG. 3 is a schematic diagram illustrating an arrangement 300 of software processes and modules executing on the security appliance 200 in accordance with the present invention. In the illustrative embodiment, the operating system software is a customized version of a Unix type operating system, although other operating systems may be used.

For both NAS and SAN environments, data is received at a proxy 320 of the security appliance. The proxy 320 is illustratively embodied as, e.g., the network protocol stack configured to interpret the protocol over which data is received and to enforce certain access control rules based on one or more policies. Each policy is served by a box manager 360. The box manager 360 is illustratively embodied as a database application process configured to manage a configuration repository or database (Config DB 370) that stores, e.g., encrypted key. A socket server 380 provides interfaces to the box manager 360, including (i) an HTTP web interface 382 embodied as, e.g., a graphical user interface (GUI) adapted for web-based administration, (ii) a SSH interface 384 for command line interface (CLI) command administration, and (iii) an SNMP interface 386 for remote management and monitoring.

Specifically, the box manager 360 supplies the permissions and encrypted keys to the proxy 320, which intercepts data access requests and identifies the sources (clients 102) of those requests, as well as the types of requests and the storage targets (cryptainers) of those requests. The proxy also queries the box manager for permissions associated with each client and, in response, the box manager 360 supplies the appropriate permissions and encrypted key (e.g., a cryptainer key). The proxy 320 then bundles the data together with the encrypted key and forwards that information to a crypto process (layer) 330 that functions as a "wrapper" for the SEP 390. As noted, the SEP resides on an interface card, which is hereinafter referred to a data crypto card (DCC 340).

The crypto layer 330 interacts with the DCC 340 by accessing (reading and writing) registers on the DCC and, to that end, functions as a PCI interface. Illustratively, a descriptor queue is used by the crypto layer to access the DCC by, e.g., supplying starting and ending points of data, as well as offsets into the data and the encrypted keys used to encrypt the data. The DCC 340 includes one or more previously loaded keys used to decrypt the supplied encrypted keys; upon decrypting an encrypted key, the DCC uses the decrypted key to encrypt the supplied data. Upon completion of encryption of the data, the DCC returns the encrypted data as ciphertext to the proxy 320, which forwards the encrypted data to the storage system 110.

Notably, the security appliance 200 "virtualizes" storage such that, to a client 102, the appliance appears as a storage system 110 whereas, from the perspective of the storage system, the security appliance appears as a client. Such virtualization requires that security appliance manipulate (IP) addresses with respect to data access requests and responses. Illustratively, certain of the customizations to the network protocol stack of the proxy 320 involve virtualization optimizations provided by the appliance. For example, the security appliance 200 manipulates (changes) the source and destination IP addresses of the data access requests and responses.

In the illustrative embodiment, the encrypted key, e.g., a cryptainer key, exchanged between the proxy 320, box manager 360 and crypto layer 330 is encrypted by a domain key. In addition, the previously loaded key used by the DCC 340 (or, more specifically, the SEP 390) to decrypt the encrypted cryptainer key is a domain key previously supplied to the SEP via the system card 250.

The present invention is directed to a system and method for securely replicating a configuration database of a security appliance. Keys stored on an original configuration database of an original security appliance are organized as a key hierarchy that is managed and cloned in accordance with the present invention. A replica or clone of the security appliance may be constructed in accordance with a cloning technique of the invention. Construction of the cloned security appliance illustratively involves sharing of data between the appliances, as well as substantially replicating the key hierarchy on a cloned configuration database of the cloned appliance.

Figure 4:
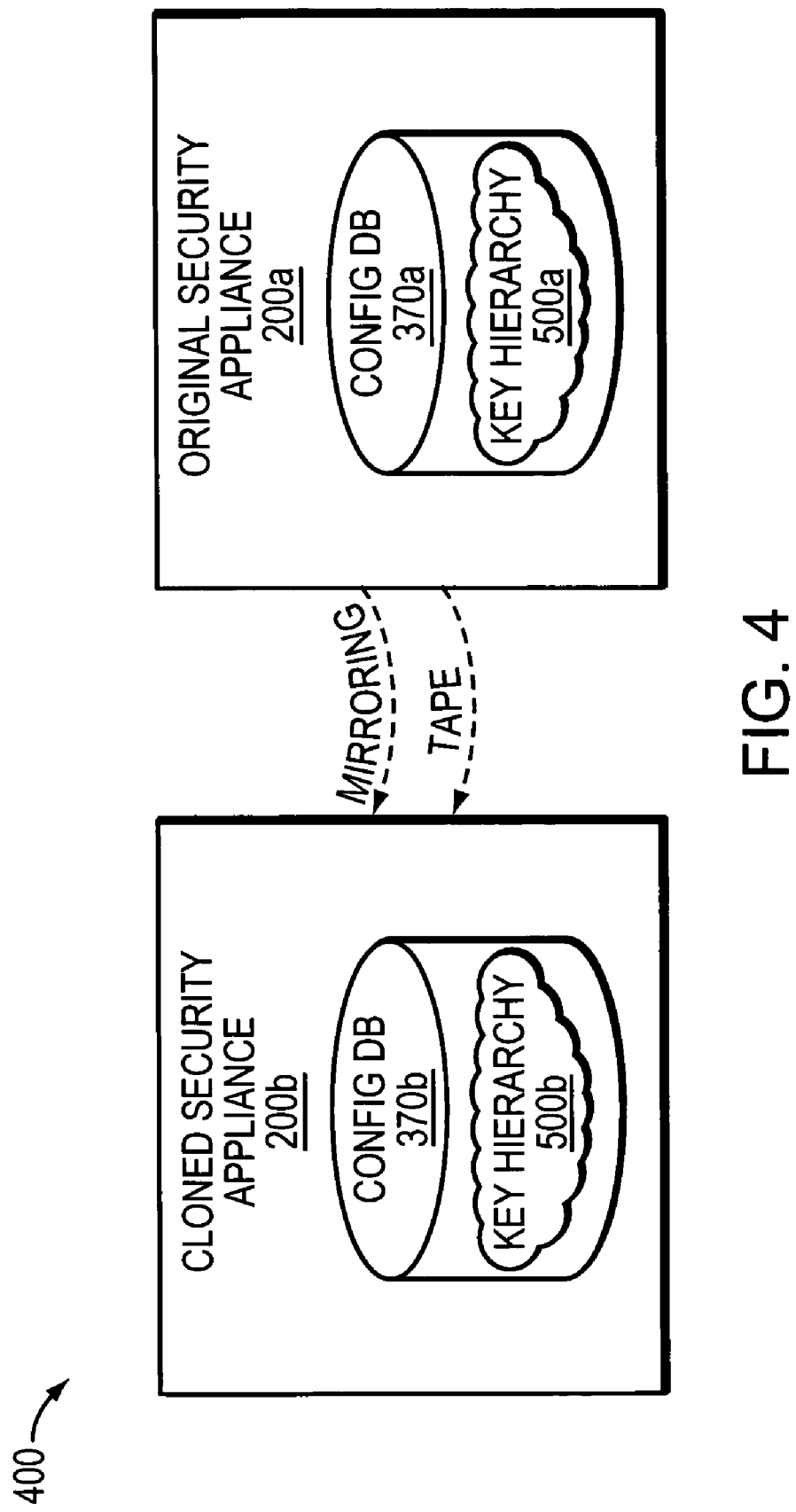
FIG. 4 is a schematic block diagram illustrating an environment including a cloned security appliance that may be advantageously used with the present invention.

FIG. 4 is a schematic block diagram illustrating an environment 400 including a is cloned security appliance that may be advantageously used with the present invention. The security appliances 200 may share recovery cards 260 or have independent (disjoint) recovery cards.

In the illustrative embodiment, a cloned security appliance 200b may be constructed as an identical image (or replica) of an original security appliance 200a in the sense that the certain keys created by the original appliance 200a can be delivered to and used by the cloned appliance 200b. Data is shared between the original and cloned appliances via, e.g., conventional mirroring operations or physical data transfer with tape. In addition, the key hierarchy 500a of the configuration database 370a on the original appliance 200a is substantially replicated at the cloned appliance 200b in accordance with the cloning technique as described herein.

Figure 5:
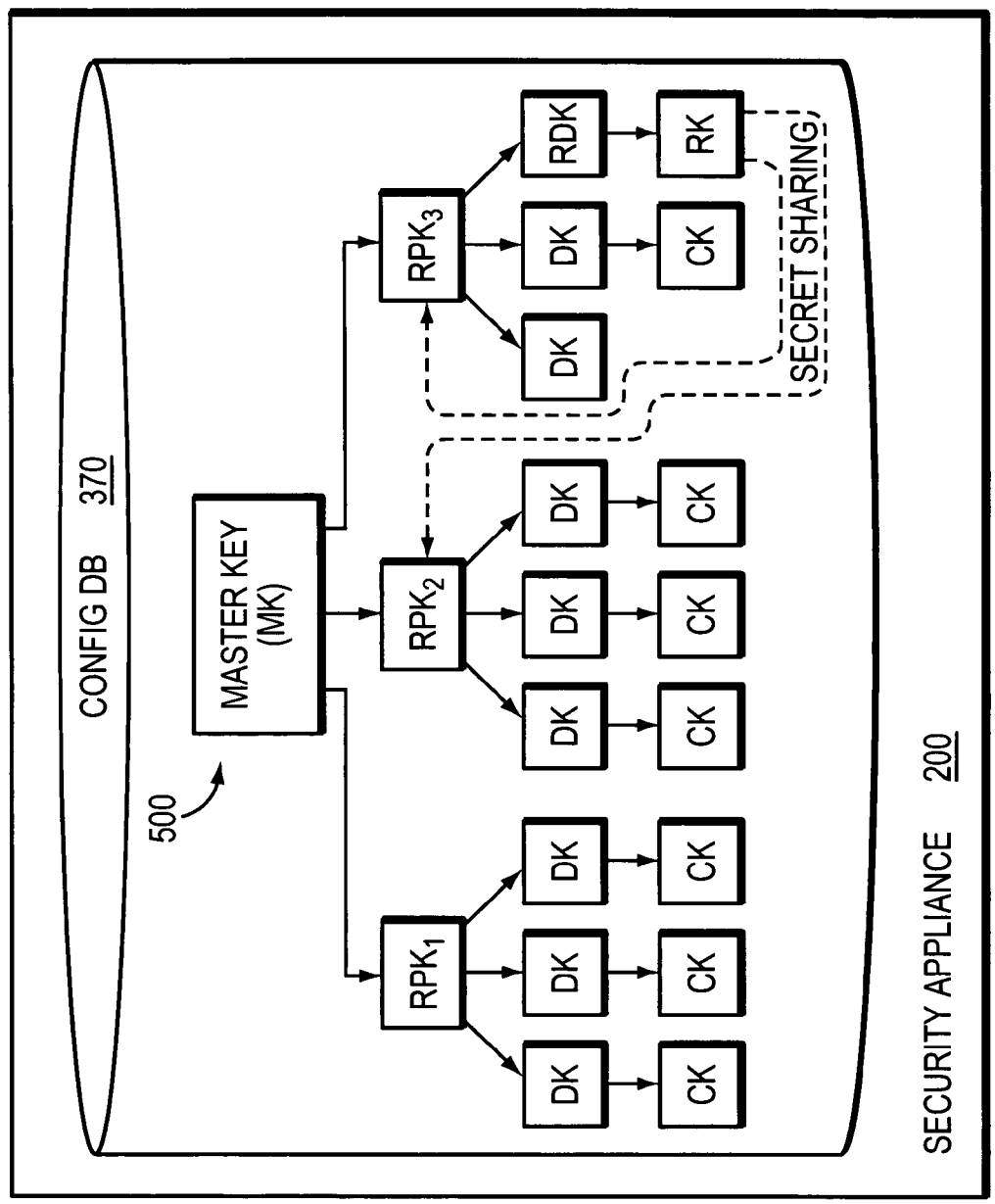
FIG. 5 is a schematic block diagram illustrating a key hierarchy in accordance with the present invention.

FIG. 5 is a schematic block diagram illustrating the key hierarchy 500 in accordance with the present invention. The keys used by security appliance 200 are illustratively created during a boot process. At that time, the key hierarchy 500 is also created, generally in response to user interaction with the security appliance via, e.g., an initialization wizard of the GUI Notably, there are one or more recovery policy keys (e.g., $RPK_1$, $RPK_2$, $RPK_3$) in the key hierarchy 500. Recovery policy keys may impose limits on retrieval of keys wrapped by them, e.g., keys wrapped by the third recovery policy key $RPK_3$ may be recoverable and may be exported to the software modules, e.g., executing on the security appliance 200.

In the illustrative embodiment, the keys wrapped by each of the recovery policy keys are domain keys DK which, in turn, are used to wrap cryptainer keys CK. These keys are generated by the SEP in response to commands issued by the software modules to generate those keys. Note that each time the SEP generates a key "below" the master key level of the key hierarchy 500, the SEP 390 wraps the generated key with the key directly "above" it in hierarchy and then exports (stores) the wrapped key to the configuration database 370.

One or more recovery cards 260 are utilized to generate one or more recovery keys. Each recovery key comprises an ID, a symmetric AES key component and an HMAC signing key component. Each recovery card 260 sends its recovery key RK to the SEP 390. One of the domain keys, i.e., the recovery domain key RDK, is designated (dedicated) for use with storing the recovery key; the SEP wraps each recovery key RK with this dedicated recovery domain key RDK. The SEP 390 uses the stored recovery key RK to encrypt "secret shares".

Illustratively, the SEP uses a "threshold scheme" or "split knowledge procedure" to convert the second and third recovery policy keys $RPK_2$, and $RPK_3$ into secret shares SS, with each share assigned to one recovery card 260. To ensure that only the correct card can access its share of the recovery policy keys, the share assigned to each card is further wrapped by the recovery key RK assigned to that card. The wrapped shares are exported by the SEP. In order to recover the second and third recovery policy keys $RPK_2$, and $RPK_3$, each wrapped share is loaded into the appropriate recovery card 260, which then unwraps the share. The unwrapped shares of the threshold, or quorum, may thereafter be combined to reconstitute the recovery policies. There are two options for reconstituting recovery policy keys using the shares SS. In the first option, reconstitution may occur anywhere, i.e., there are no restrictions enforced by the recovery cards. In the second option, the unwrapped shares may only be sent to security appliance hardware, i.e., secure hardware restriction. For this reason, there are two recovered recovery policies, as one may be recovered only in the security appliance hardware, whereas the other need not be. Essentially, this enables use of the recovery cards to recover the recovery policy keys. With these keys, all keys below those recovery policy keys in the key hierarchy may be unwrapped from a copy. As noted, a quorum of recovery cards is needed to recovery any keys within the key hierarchy; in the illustrative embodiment, two recovery cards are needed to satisfy the quorum and, thus, to restore the security appliance to a full state (i.e., box recovery).

Figure 6:
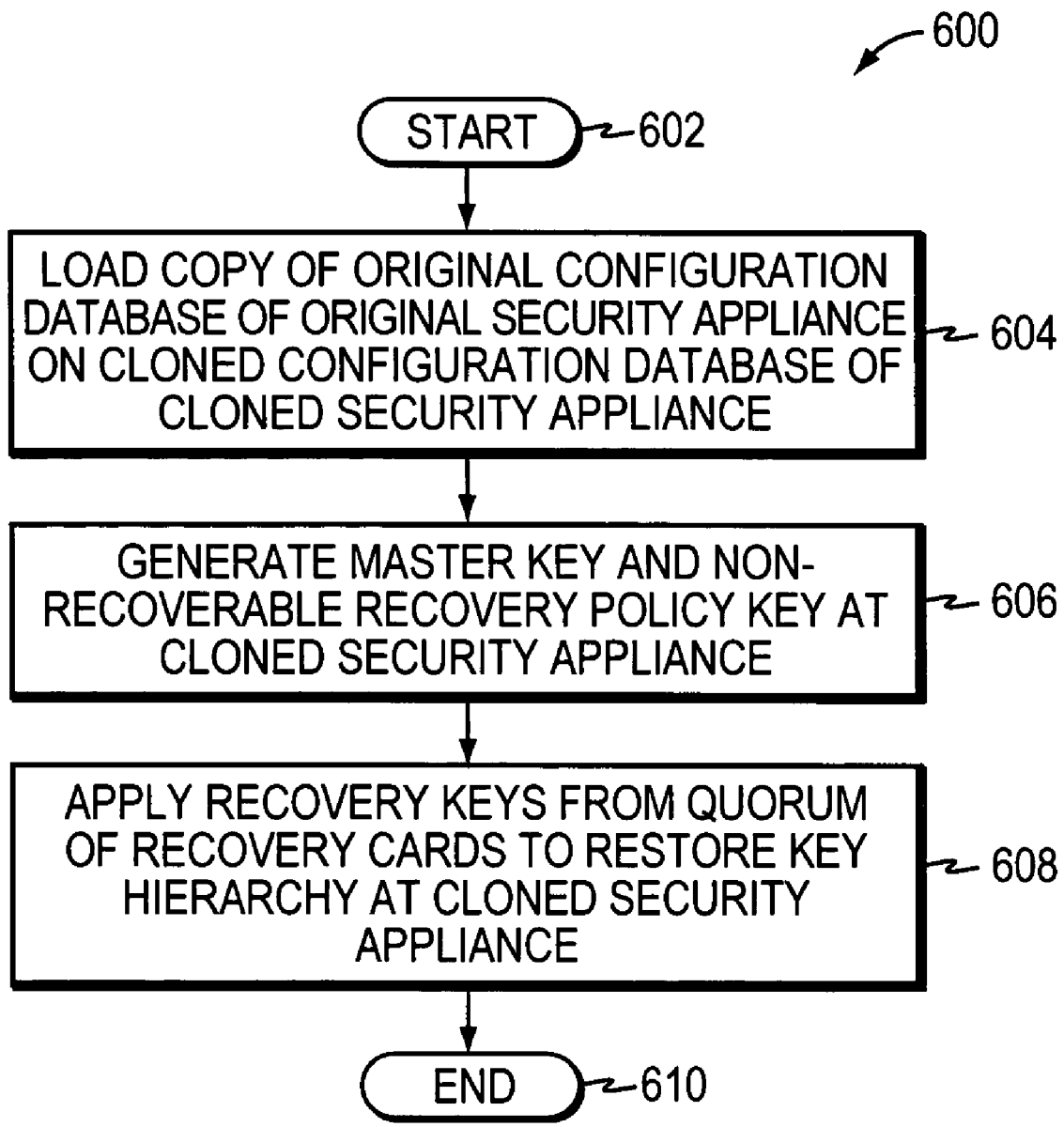
FIG. 6 is a flowchart illustrating a sequence of steps of a cloning technique in accordance with the present invention.

In accordance with the present invention, the cloning technique may be invoked to securely create a cloned security appliance in response to, e.g., a failure to an existing security appliance or a request to provide an additional security appliance replica. FIG. 6 is a flowchart illustrating a sequence of steps of the cloning technique in accordance with the present invention. The sequence 600 starts in Step 602 and proceeds to Step 804 where, upon the occurrence of the failure or request, a copy of data of the original configuration database 370a on the original security appliance 200a is loaded onto a cloned configuration database 370b of the cloned security appliance 200b. As noted, the (original) configuration database includes data (information), such as configuration settings, permissions and access control lists, in addition to wrapped keys. This information is shared between the appliances when loading the copy of the original configuration database onto the cloned configuration database 370b. Illustratively, software modules executing on the cloned security appliance manage the sharing of information in accordance with an intelligent operation that determines the type of information needed to be restored/recovered on the cloned database.

In Step 606, the SEP 390 of the cloned security appliance 200b generates the master key MK and its non-recoverable recovery policy key ($RPK_1$) for storage on the cloned configuration database as described above. In Step 608, recovery keys from a quorum of recovery cards (e.g., 2 of 5 recovery cards) are then applied to (used with) the cloned configuration database to thereby restore the key hierarchy on the cloned security appliance. The quorum of recovery cards has the appropriate recovery policy keys needed to replicate (or restore) all keys from the corresponding recoverable portion of the key hierarchy. By applying recovery keys from the recovery cards 260 to the cloned configuration database, substantially all of the key material, of the original configuration database may be restored on the cloned configuration database of the cloned security appliance. That is, the recovery keys enable restoration of recovery policy keys of the key hierarchy, as well as all domain keys and cryptainer keys below those recovery policy keys in the hierarchy. Note that the keys capable of recovery include the recovery key (stored by the recovery domain key) for all other recovery cards, i.e., other than those in the quorum. The sequence then ends at Step 610.

The novel cloning technique may be advantageously used to solve various key management problems encountered by customers. For example, the novel technique may is be used to create multiple cloned security appliances based on a copy of the configuration database on the original security appliance even when that original appliance has not failed. Each of these cloned security appliances has the same configuration settings, which may be advantageous in a large customer enterprise environment that requires substantial storage (secure) bandwidth. Furthermore, in contrast to previous techniques, the novel cloning technique allows a user to decide what key material is recoverable (and not) using the novel key hierarchy. The keys of the hierarchy embody 256-bit strong cryptography and require only a quorum of recovery cards to restore recoverable key material of the hierarchy. Although the illustrative embodiment describes a quorum of 2 out of 5 recovery cards needed to recover and/or clone a new configuration database 370, it will be understood to those of skill in the art that any type of quorum (e.g., 2 out of 4, 3 out of 5, etc.) may be used in accordance with the principles of the present invention.

The foregoing description has been directed to specific embodiments of this invention. It will be apparent, however, that other variations and modifications may be made to the described embodiments, with the attainment of some or all of their advantages. For instance, it is expressly contemplated that the procedures, processes, layers and/or modules described herein may be implemented in hardware, software, embodied as a computer-readable medium having executable program instructions, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for securely replicating a configuration database of a security appliance, the method comprising:
   loading a copy of data of an original configuration database from an original security appliance onto a cloned configuration database of a cloned security appliance, wherein the configuration database comprises encryption keys used to perform at least one of encrypting the data and decrypting the data stored on cryptainers;
   generating a first non-recoverable recovery policy key of a key hierarchy for storage on the cloned configuration database; and
   applying recovery keys, from a quorum of recovery cards of the cloned security appliance, to one or more recoverable recovery policy keys of the cloned configuration database to restore all keys from a corresponding recoverable portion of the key hierarchy on the cloned security appliance to thereby substantially replicate all key material of the original configuration database on the cloned configuration database of the cloned security appliance.

2. The method of claim 1 further comprising organizing one of encryption and signature keys stored on the original configuration database into the key hierarchy.

3. The method of claim 2 wherein loading the copy of the data of the original configuration database comprises sharing data between the appliances, wherein the data comprises information additional to the keys of the key hierarchy.

4. A system configured to securely replicate a configuration database of a security appliance, the system comprising:
   a first configuration database including a copy of data stored on a second configuration database, wherein the configuration database comprises encryption keys used to perform at least one of encrypting the data and decrypting the data stored on cryptainers;
   a first security appliance coupled to the first configuration database, the first security appliance configured to generate a first non-recoverable recovery policy key of a key hierarchy for storage on the first configuration database; and
   one or more recovery cards of the first security appliance, the one or more recovery cards configured to apply one or more recovery keys, from a quorum of the one or more recovery cards, to one or more recoverable recovery policy keys of the first configuration database to restore all keys from a corresponding recoverable portion of the key hierarchy on the first security appliance, thereby replicating key material of the second configuration database on the first configuration database.

5. The system of claim 4 wherein the corresponding recoverable portion of the key hierarchy comprises second and third recovery policy keys, as well as all domain keys and secure storage keys below the second and third recovery policy keys in the hierarchy.

6. The system of claim 5 wherein the secure storage keys are cryptainer keys.

7. The system of claim 5 wherein the first configuration database is a clone of the second configuration database.

8. A key hierarchy configured to organize keys stored on a configuration database of a security appliance, the key hierarchy comprising:
   a master key generated by a storage encryption processor (SEP) of the security appliance;
   a plurality of recovery policy keys generated by the SEP and wrapped with the master key;
   one or more domain keys generated by the SEP, each domain key wrapped with one of the recovery policy keys;
   one or more cryptainer keys generated by the SEP, each cryptainer key wrapped with one of the domain keys; and
   one or more recovery keys, from a quorum of one or more recovery cards, utilized to enable restoration of at least one recovery policy key and those domain keys and those cryptainer keys below the at least one recovery policy key in the key hierarchy.

9. The key hierarchy of claim 8 wherein the recovery policy keys comprise a first recovery policy key and wherein keys wrapped by the first recovery policy key are unrecoverable.

10. The key hierarchy of claim 9 wherein unrecoverable keys wrapped by the first recovery policy key include one or more non-recoverable domain keys configured to wrap one or more unrecoverable cryptainer keys.

11. The key hierarchy of claim 9 wherein the at least one recovery policy key comprises a second recovery policy and wherein keys wrapped by the second recovery policy key are recoverable to hardware on the security appliance.

12. The key hierarchy of claim 11 wherein the hardware on the security appliance includes the SEP.

13. The key hierarchy of claim 11 wherein the at least one recovery policy key comprises a third recovery policy and wherein keys wrapped by the third recovery policy key are recoverable and exportable to software executing on the security appliance.

14. An apparatus configured to securely replicate a configuration database of a security appliance, the apparatus comprising:
 means for loading a copy of data of an original configuration database from an original security appliance onto a cloned configuration database of a cloned security appliance, wherein the configuration database comprises encryption keys used to perform at least one of encrypting the data and decrypting the data stored on cryptainers;
 means for generating a first non-recoverable recovery policy key of a key hierarchy for storage on the cloned configuration database; and
 means for applying recovery keys, from a quorum of recovery cards of the cloned security appliance, to one or more recoverable recovery policy keys of the cloned configuration database to restore all keys from a corresponding recoverable portion of the key hierarchy on the cloned security appliance to thereby replicate key material of the original configuration database on the cloned configuration database of the cloned security appliance.

15. The apparatus of claim 14 further comprising means for organizing keys stored on the original configuration database as the key hierarchy.

16. A computer readable storage medium containing program instructions executed by a processor, comprising:
 program instructions that load a copy of data on an original configuration database from an original security appliance onto a cloned configuration database of a cloned security appliance, wherein the configuration database comprises encryption keys used to perform at least one of encrypting the data and decrypting the data stored on cryptainers;
 program instructions that generate a first non-recoverable recovery policy key of a key hierarchy for storage on the cloned configuration database; and
 program instructions that apply appropriate recovery keys, from a quorum of recovery cards of the cloned security appliance, to one or more recoverable recovery policy keys of the cloned configuration database to restore all keys from a corresponding recoverable portion of the key hierarchy on the cloned security appliance to thereby replicate key material of the original configuration database on the cloned configuration database of the cloned security appliance.

17. The computer readable medium of claim 16 further comprising program instructions that organize keys stored on the original configuration database as the key hierarchy.

* * * * *